Aug. 7, 1923.  
L. J. HOGARTY  
COMBINED DEPTH AND HEIGHT GAUGE  
Filed Nov. 11, 1920
1,464,428
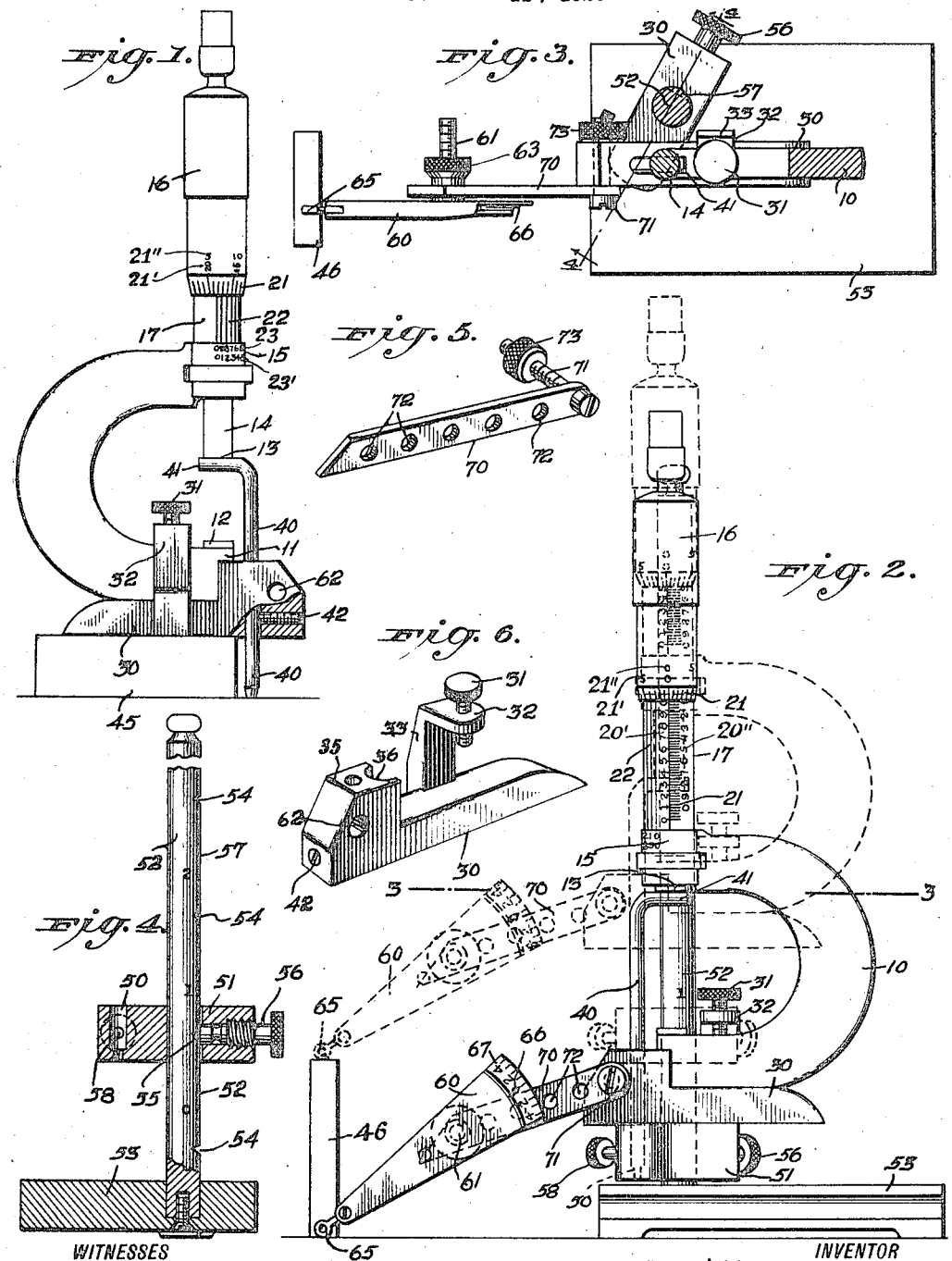
WITNESSES
INVENTOR  
Leo J. Hogarty  
BY  
ATTORNEYS Patented Aug. 7, 1923.

1,464,428

UNITED STATES PATENT OFFICE.

LEO J. HOGARTY, OF BROOKLYN, NEW YORK.

COMBINED DEPTH AND HEIGHT GAUGE.

Application filed November 11, 1920. Serial No. 423,449.

*To all whom it may concern:*

Be it known that I, LEO J. HOGARTY, a citizen of the United States, and a resident of the city of New York, borough of Brooklyn, in the county of Kings and State of New York, have invented a new and Improved Combined Depth and Height Gauge, of which the following is a full, clear, and exact description.

The invention relates to geometrical instruments, and its object is to provide a new and improved combined depth and height gauge of the micrometer type and arranged to enable the user to readily see and read the distance between opposed contacts to one ten thousandths of an inch.

Another object is to permit of detaching the micrometer caliper for use as such.

With these and other objects in view, the invention consists of certain novel features of construction, as hereinafter shown and described and then specifically pointed out in the claims.

A practical embodiment of the invention is represented in the accompanying drawings forming a part of this specification, in which similar characters of reference indicate corresponding parts in all the views.

Figure 1 is a side elevation of the combined depth and height gauge arranged for use as a depth gauge;

Figure 2 is a similar view of the same arranged as a height gauge;

Figure 3 is a sectional plan view of the same on the line 3—3 of Figure 2;

Figure 4 is a transverse section of the stand forming part of the instrument when used as a height gauge, the section being on the line 4—4 of Figure 3;

Figure 5 is a perspective view of an extension member for use as a scriber; and

Figure 6 is a perspective view of the base for attachment to the frame of the micrometer caliper.

In forming the combined depth and height gauge, use is made of a micrometer caliper of usual construction and having a U-shaped frame 10 supporting at the outer end 11 a fixed measuring face 12 disposed opposite the measuring face 13 on the movable screw 14 held in the other end 15 of the frame 10. A sliding movement is given to the movable member 14 in the usual manner by turning the thimble 16 mounted on the hub 17 attached to the upper end 15 of the frame 10. The thimble 16 and the hub 17 are provided with the usual coacting graduations 20 and 21 reading thousandths of an inch, and the hub is also provided with a vertical line graduation 22 for reading ten thousandths of an inch by the use of the graduation 20 and corresponding figures 23 provided on the upper end 15 of the frame 10 and reading from the left to the right. The graduations 20 and 22 function cooperatively in the manner of a Vernier scale to give readings of ten thousandths of an inch.

In addition to the usual rows of figures 20', 21', and 23, associated respectively with the graduations 20, 21 and 22, I provide reversely reading rows of figures such as 20", 21" and 23' associated with the same scales. The figures 20" and 23' are in alignment with the sets of figures 20' and 23 respectively and read reversely, but it will be noted in the set of figures 21" that the 10 registers with the 1 of the column 21' instead of with the zero as in the other scales. The purpose of this arrangement of the figures will hereinafter appear. The outer end 11 of the frame 10 is detachably secured to a base 30 by the use of a clamping screw 31 screwing in a lug 32 extending from an arm 33 attached to or forming part of the base 30. The forward end of the base 30 is provided with a raised portion 35 formed on its inner face with a recess 36 into which projects the end 11 of the frame 10 to securely hold the base 30 in position on the frame 10. It will be noticed that on loosening the clamping screw 31 the frame 10 of the micrometer caliper can be readily detached from the base 30 to allow the use of the micrometer caliper independently of the base for calipering purposes. In using the instrument, however, as a depth or a height gauge the base 30 and the frame 10 are firmly secured one to the other.

In the outer portion of the base 30 is mounted to slide a vertically disposed rod 40 provided at its upper end with an angular arm 41 projecting into the path of the measuring face 13 of the movable member 14 of the micrometer caliper. A set screw 42 screwing in the base 30 serves to fasten the rod 40 in any adjusted position. The rod 40 is preferably of such length (say 2 inches) that when its bottom is flush with the bottom of the base 30 and the reading face 13 is in contact with the arm 41 then the movable member 14 is in zero position relative to the set of Figures 21″. When using the instrument as a depth gauge the base 30 is placed on the object 45 of which the depth is to be measured, as shown, for instance, in Figure 1. The rod 40 is pushed downward to the depth of the object, after which the thimble 16 is turned to move the movable member 14 downward until the measuring face 13 contacts with the arm 41. The depth of the object 45 can now be read on the micrometer caliper by referring to the scales 20, 21 and 22 and the columns of numerals 20″, 21″ and 23′.

When using the instrument as a gauge for measuring the height of an object 46 then the following arrangement is made, special reference being had to Figures 2 and 3: The lower end of the rod 40 is seated in a socket 50 formed in a supporting block 51 mounted to slide up and down on a post or standard 52 rising from the base 53. The post 52 is provided with notches 54 spaced distances apart corresponding to a unit linear measurement such, for instance, as inches. The lowermost or zero notch is a short distance above the top of the base 53 (see Figure 4). Any one of the notches 54 is adapted to be engaged by a point 55 formed on a screw 56 screwing in the block 51 to support the latter the desired distance above the base 53. The post is provided with a flat portion 57 at the notches 54 and this flat portion is adapted to be engaged by the clamping screw 56 to securely fasten the block 51 in the adjusted position on the post. The top of the angular arm 41 of the rod 40 is a predetermined distance from the top of the block 51, say, for instance, two inches, as shown in Figure 2. For different work it is necessary to use rods 40 of different length, each of the rods, however, being fastened in place in the socket 50 by a set screw 58.

An indicator 60 of any approved construction may be removably fastened to the base 30 by the use of a transverse screw rod or clamping bolt 61 engaging an aperture 62 formed in the base 30. A nut 63 screws on the clamping bolt 61 and is adapted to abut against the rear face of the base 30 to securely fasten the indicator 60 in place on the base. The indicator 60 is provided with the usual pivoted contact member 65 controlling a pointer 66 indicating on a graduation 67 formed on the rear end of the indicator 60. The zero mark of the graduation 67 is at the middle of the height of the graduation, as plainly shown in Figure 2, to permit of readily setting the indicator to zero on correspondingly turning the thimble 16 at the time the contact 65 is in engagement with the top of the object 46 to be measured as to the height.

Instead of using the indicator 60 directly on the base 30 it may be used on an extension arm 70 adapted to be fastened to the base 30 by the use of a clamping bolt 71. The extension arm 70 is provided with a series of apertures 72, any one of which may be engaged by the screw rod or clamping bolt 61. The screw rod or clamping bolt 71 is passed through the aperture 62 and by the use of its nut 73 is fastened to the base 30 with the arm 70 projecting a corresponding distance to one side, say to the left of the base 30.

By reference to Figure 2, the extension arm 70 is fastened by the clamping bolt 71 to the base 30 held in zero position on the post 52. The indicator 60 is fastened to the extension arm 70 by the use of the clamping bolt 61 with the contact member 65 in engagement with the surface on which rests the base 53, the pointer 66 indicating on zero on the graduation 67. The screw 14 is shown in zero position relative to the figures 21″ with the face 13 in engagement with the arm 41 of the rod 40. Presuming that the heigth of the object 46 is to be measured. As the object 46 is more than an inch and less than two inches the base 30 is raised an inch on the post 52, then fastened in place by the set screw 56 engaging the notch 54 next above the zero notch 54. The operator next turns the thimble 16 whereby the micrometer is raised owing to the face 13 being in contact with the arm 41 of the fixed rod 40. When the contact member 65 reaches the top of the object 46 the operator reads the figures 20″, 21″ and 23′ of the micrometer and adds one inch thus obtaining the height of the object 46.

The position of the screw 14 at the time of the first reading is immaterial since if this reading is not zero, but, .1552 for instance, and the second reading is .6552, the height of the object will be ½ inch or .5000 and can be obtained by noting the difference instead of taking the reading directly.

From the foregoing it will be seen that by the arrangement described the micrometer caliper in conjunction with the members described forms a depth and height gauge and the micrometer caliper may be readily detached from the base 30 to permit of using the micrometer caliper for calipering purposes in the usual manner.

Having thus described my invention, I claim as new and desire to secure by Letters Patent:—

1. A combined height and depth gauge, comprising a micrometer caliper having a frame, an anvil stationary relative to said frame and an anvil movable relative to said frame, a base secured to said frame adjacent the stationary anvil, a rod slidably held on the said base and having an angular arm adapted to be engaged by said movable anvil, and an indicator mounted on the said base and having a movable contact adapted to contact with the surface of the object to be measured.

2. A combined height and depth gauge, comprising a stand having a post provided with linear graduations, a block adjustably secured on the said post, a rod extending parallel to said post, said rod being held on the said block and provided with an angular arm, a base slidable on the said rod, a micrometer caliper mounted on the said base and having a stationary anvil and a movable anvil, said stationary anvil being disposed adjacent the base, the said angular arm extending into the path of the movable anvil, and a member extending laterally of the post, said member being mounted on the said base and adapted to engage the object to be measured.

3. A combined height and depth gauge, comprising a stand having a post provided with linear graduations, a block adjustably secured on the said post, a rod extending parallel to said post, said rod being held on the said block and provided with an angular arm, a base slidable on the said rod, a micrometer caliper mounted on the said base and having a stationary anvil and a movable anvil, said stationary anvil being disposed adjacent the base, the said angular arm extending into the path of the movable anvil, and a member extending laterally of the post, said member being mounted on the said base and adapted to engage the object to be measured, the said laterally extending member having indicating means for accurately setting the gauge.

4. In a combined height and depth gauge a base on which is adapted to rest one end of the frame of a micrometer caliper having a stationary anvil and a movable anvil, the base having a raised portion provided with a recess into which fits the said frame end, the said base having a clamping arm extending upwardly and terminating in an angular lug, a clamping screw screwing in the said lug and engaging the said end of the frame of the micrometer caliper to fasten the base and the micrometer caliper together, and a vertical rod slidable on the said base and having an angular arm extending into the path of the movable anvil.

LEO J. HOGARTY.